(12) United States Patent
Johansen

(10) Patent No.: US 10,525,503 B2
(45) Date of Patent: *Jan. 7, 2020

(54) METHOD FOR THE PREPARATION OF A CATALYSED MONOLITH

(71) Applicant: Haldor Topsøe A/S, Kgs. Lyngby (DK)

(72) Inventor: Keld Johansen, Frederikssund (DK)

(73) Assignee: Halder Topsoe A/S, Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/067,635

(22) PCT Filed: Feb. 22, 2017

(86) PCT No.: PCT/EP2017/053979
§ 371 (c)(1),
(2) Date: Jul. 2, 2018

(87) PCT Pub. No.: WO2017/144491
PCT Pub. Date: Aug. 31, 2017

(65) Prior Publication Data
US 2019/0001305 A1 Jan. 3, 2019

(30) Foreign Application Priority Data

Feb. 24, 2016 (DK) .................................. 2016 00108

(51) Int. Cl.
| | | |
|---|---|---|
| *B05D 7/22* | (2006.01) | |
| *B01J 23/44* | (2006.01) | |
| *B01J 35/04* | (2006.01) | |
| *B01D 53/94* | (2006.01) | |
| *F01N 3/28* | (2006.01) | |
| *F01N 3/035* | (2006.01) | |
| *B01J 35/00* | (2006.01) | |
| *B01J 23/10* | (2006.01) | |
| *B01J 37/02* | (2006.01) | |
| *B01J 37/08* | (2006.01) | |
| *B01J 37/34* | (2006.01) | |

(52) U.S. Cl.
CPC ............ *B05D 7/22* (2013.01); *B01D 53/944* (2013.01); *B01J 23/10* (2013.01); *B01J 23/44* (2013.01); *B01J 35/0013* (2013.01); *B01J 35/04* (2013.01); *B01J 37/0228* (2013.01); *B01J 37/0236* (2013.01); *B01J 37/088* (2013.01); *B01J 37/346* (2013.01); *F01N 3/035* (2013.01); *F01N 3/2807* (2013.01); *F01N 3/2828* (2013.01); *B01D 2255/1021* (2013.01); *B01D 2255/1023* (2013.01); *B01D 2255/2065* (2013.01); *B01D 2255/20715* (2013.01); *B01D 2255/9155* (2013.01); *B05D 2203/30* (2013.01); *B05D 2254/04* (2013.01); *F01N 2330/06* (2013.01); *F01N 2370/02* (2013.01); *F01N 2510/06* (2013.01)

(58) Field of Classification Search
CPC ... B05D 7/22; B05D 2203/30; B05D 2254/04
See application file for complete search history.

(56) References Cited

U.S. PATENT DOCUMENTS

| | | | |
|---|---|---|---|
| 3,856,707 A | 12/1974 | Kato et al. | |
| 4,134,860 A | 1/1979 | Hindin et al. | |
| 4,329,162 A | 5/1982 | Pitcher, Jr. | |
| 4,931,419 A * | 6/1990 | Blanchard | B01D 53/945 502/304 |
| 5,866,210 A * | 2/1999 | Rosynsky | B01J 35/04 118/50 |
| 6,478,874 B1 * | 11/2002 | Rosynsky | B01J 37/0215 118/50 |
| 7,374,792 B2 * | 5/2008 | Rosynsky | B01J 37/0215 427/231 |
| 2004/0001781 A1 | 1/2004 | Kumar et al. | |
| 2004/0005401 A1 | 1/2004 | Becker | |
| 2004/0209769 A1 | 10/2004 | Demel et al. | |
| 2005/0031514 A1 | 2/2005 | Patchett et al. | |
| 2006/0154816 A1 | 7/2006 | Domesle et al. | |
| 2008/0145531 A1 | 6/2008 | Rosynsky et al. | |
| 2011/0268624 A1 * | 11/2011 | Chandler | A44B 13/0011 422/222 |
| 2011/0288302 A1 | 11/2011 | Barthe | |
| 2015/0224477 A1 | 8/2015 | Johansen | |
| 2018/0229228 A1 * | 8/2018 | Arulraj | B01D 46/2418 |

FOREIGN PATENT DOCUMENTS

WO    WO-9947260 A1 *  9/1999  ............. B01J 35/04

* cited by examiner

*Primary Examiner* — William P Fletcher, III
(74) *Attorney, Agent, or Firm* — Blank Rome LLP

(57) ABSTRACT

A method for the preparation of a catalyzed monolithic body or a catalyzed particular filter. The method includes the step of suctioning a sol-solution containing catalytically active material and metal oxide catalyst carriers or precursors thereof into pores of a monolithic substrate, solely by capillary forces and without the application of vacuum or pressure.

13 Claims, No Drawings

METHOD FOR THE PREPARATION OF A CATALYSED MONOLITH

The present invention relates to catalysed monolithic substrates. In particular, the invention provides an improved method for the preparation of a catalysed monolithic substrate, optionally a catalysed particulate filter by capillary suction of a sol-solution containing catalytically active material and metal oxide catalyst carriers or precursors thereof into pores of monolithic substrate.

Catalysed monoliths are typically employed in the cleaning of engine exhaust gas for the catalytically removal of noxious compounds in the exhaust gas. For the removal of particulate matter with moderate filtration efficiency in exhaust gas from lean burning engines catalysed monoliths are used as flow through filters.

Most typically, filters with high filtration efficiency for use in automotive applications are the wall flow type filter consisting of monolithic honeycomb body, wherein particulate matter is captured on or in partition walls of the honeycomb structure. These filters have a plurality longitudinal flow channels separated by gas permeable partition walls. Gas inlet channels are open at their gas inlet side and blocked at the opposite outlet end and the gas outlet channels are open at the outlet end and blocked the inlet end, so that a gas stream entering the wall flow filter is forced through the partition walls before into the outlet channels.

In addition to capturing soot particles, particulate filters are typically catalysed with catalysts active in the burning of soot and removal of nitrogen oxides (NOx), carbon monoxide and unburnt hydrocarbons, which are compounds representing a health and environmental risk and must be reduced or removed from the exhaust gas.

Catalysts being active in the burning off soot in presence of oxygen or nitrogen dioxide formed from nitrogen oxide and further removal or reduction of NOx, carbon monoxide and hydrocarbons to harmless compounds are per se known in the art.

The patent literature discloses numerous cleaning systems comprising separate catalyst units for the removal of harmful compounds from engine exhaust gas.

Also known in the art are exhaust gas particulate filters coated with catalysts catalysing oxidation of hydrocarbons and particulate matter together with selective catalytic reduction (SCR) of NOx by reaction with ammonia being added as such or as precursor thereof into the exhaust gas.

Washcoating of a monolithic or honeycomb monolithic substrate is usually performed by slurry pickup in the substrate by pouring or pumping the slurry into the channels of the monolithic substrate, or by dipping the substrate at one side into the washcoat slurry and optionally applying vacuum at the opposite side. Surplus of washcoat can be removed by pressurized air or vacuum from one of the sides but then will washcoat easily be removed inside the wall.

After having been coated with the washcoat, the substrate is dried and finally calcined for activation of the catalytic components in the coat.

A problem with washcoating a substrate is that it affects concentration gradients of the catalytic components, in the filter wall, in the thickness of the washcoat layer on the wall and along the axis of channels in the monolith. As such, it has a potential impact on the quality of the finished catalyst.

Washcoating of wall flow filters with a particle suspension is particularly difficult to control as some the channels are closed in the end faces and an air knife for securing even coating distribution is hindered by the filter walls.

Compared to known technique, the present invention suggests an easier method for the coating of monolithic substrates by using a sol-solution containing all catalyst ingredients as catalyst carrier precursors and metal catalyst precursors and suction of this sol-solution up into pores in the walls of the monolithic substrate by capillary forces.

A sol-solution is in context with present invention a mixture of a suspension of solid particles in a solution of water soluble compounds.

The invention provides a method for the preparation of a catalysed monolith, comprising the steps of a) providing a porous monolith substrate with a plurality of longitudinal flow channels separated by gas permeable partition walls, the monolith substrate having a first end face and at a distance to the first end face a second end face;

b) in a container providing a sol solution at least in an amount corresponding to pore volume of the gas permeable partition walls, the sol solution containing a water soluble or colloidal precursor of one or more catalytically active compounds and a water soluble or colloidal precursor of one or more metal oxides catalyst carrier compounds, at least one of the one or more precursors is colloid and at least one of the one or more precursors is water soluble;

c) placing the monolith substrate substantially vertically in the container with the first or second end face dipped into the sol solution;

d) sucking up the sol solely by capillary forces into pores of the permeable partition walls from the end face dipped into the sol solution without applying vacuum or pressure to a predetermined distance in the permeable partition walls from the end face dipped into the sol solution;

e) subsequently inverting the monolith substrate and placing the monolith substrate substantially vertically in the container with the opposite end face dipped into the sol solution;

f) sucking up the sol solely by capillary forces into pores of the permeable partition walls from the opposite end face dipped into the sol solution without applying vacuum or pressure; and g) drying and calcining the thus coated monolith substrate.

Besides providing an easier coating method, a further advantage of the invention is that only the surface of the pores in the filter are coated after drying and calcination, which results in operation of the thus prepared catalysed monolith in a reduced pressure drop over catalysed monolith, in particular when the catalysed monolith is a wall flow filter.

The sol solution is typically formulated from metal oxide precursors of ceria, alumina, titania, zirconia, silica sols in combination with dissolved catalytically active metal precursor, preferably compounds of palladium, platinum, rhodium, vanadium, molybdenum, tungsten and mixtures thereof in a liquid dispersion agent, typically aqueous solutions of acids. For different precursors the pH can be acidic, basic or neutral dependant on the pH stability of the actual sols.

Preparation of the sol solution involves conversion of monomers into a colloidal solution that acts as the precursor of discrete particles of the metal oxides catalyst carrier and catalytically active metal compounds. Typical precursors are metal nitrates and stabilized metal hydroxides or oxyhydroxides. Ammonium compounds are typical stabilizers. The acidity of the sol solution is adjusted to a pH value, where the sol is stable and does not form a gel.

The size of colloidal precursors lies between 1-1000 nm, preferably between 1-100 nm. The size of the colloidal precursors is significant less than the pore size diameter in the monolith walls, namely typically 1-30 µm.

In order to provide the correct amount of the sol-solution, the pore volume of the monolithic substrate is measured prior to coating of the monolithic substrate by conventional methods known in the art.

By the method according to the invention, the sol solution is sucked up and adsorbed within the pores of monolith substrate by solely capillary forces to a certain distance or height of the monolith substrate on the walls of the substrate upwardly from the end face dipped into the sol solution without any necessary assistance of external forces like vacuum or pressure applied on the end faces. The sol solution is sucked up to a certain distance from the end face dipped into the sol solution. The wetted length of the substrate that is the distance between the wetted end of the substrate and the wet front is dependent on the porosity of the substrate. The wetted length is also proportional to the liquid-air surface tension. The liquid-air tension decreases at increasing temperatures. It is therefore preferred to perform the wetting process at low temperatures, most preferably between 15 and 30° C.

The rate of adsorption of the sol solution decreases over time. When the rate of adsorption is substantially decreasing or zero, the substrate is inverted and dipped into the sol solution with the end face opposite the face of the previous pore filling stage.

To assure that substantially the full length of the monolith substrate is wetted that is all pores in the substrate walls are filled with the sol solution it is preferred to invert the substrate at half wall pore filling, either determined by the time it takes to fill up the pores in half of the length of the substrate walls or by calculating the necessary amount of the sol solution to fill up the pores in half of the length of the substrate walls.

The sucking up steps can be repeated once or more times.

Having finished the pore filling steps, the monolith substrate is dried and water evaporated from the pores. As already mentioned above, the drying step concentrates the amount of fine particles of the catalytic material and the carrier material substantially on the pore surfaces of the monolith substrate.

Drying is preferably carried out by application of microwaves.

The dried monolith substrate is finally activated by conversion of the precursor compounds to the active catalytic compounds and metal oxide catalyst carrier compounds by calcination.

As already mentioned above, the method according to the invention is in particular useful for filling pores in walls of a wall flow filter with the sol solution.

The monolithic substrate can in all cases be made of porous ceramic material or porous metallic material.

Preferably, the monolithic substrate is made of cordierite, aluminium titanate, mullite or silicon carbide.

EXAMPLE

An aqueous sol solution containing a precursor of cerium oxide, zirconium oxide, palladium and platinum was prepared in diluted nitric acid. The content and type of precursors are summarized in Table 1 below.

TABLE 1

| Compound | Amount/g |
| --- | --- |
| Water | 2343.3 |
| Ce(NO3)3 solution | 2167.4 |
| Zr-sol | 499.9 |
| Pd(NH3)4(HCO3)2 | 0.97 |
| Pt(NH3)4(HCO3)2 | 6.29 |
| HNO3 (65%) | 0.9 |
| Total | 5018.7 |

A wall flow filter cordierite substrate (NGK SCFC12 Ø10.5"×L12") having a total volume of 17.03 l, a height of 30.5 cm and a pore volume of 2810 ml corresponding to 3100 g of the above sol solution as calculated on the total density (g/ml) of the sol solution and the total pore volume of the wall flow filter (ml).

3300 g the above sol solution is filled into a pan. The wall flow filter is then placed with one of the end faces into the pan and the weight of the pan is monitored by a weight. After having sucked up half of the amount of the sol solution, the wall flow filter is inverted and placed with the other face end into the pan. After the calculated amount of the sol solution has been sucked up, the thus coated wall flow filter is dried at 120° C. and calcined at a temperature of 600° C. The coating process is performed at a temperature of 25° C.

The invention claimed is:

1. A method for the preparation of a catalysed monolith, comprising the steps of
   a) providing a porous monolith substrate with a plurality of longitudinal flow channels separated by gas permeable partition walls, the monolith substrate having a first end face and at a distance to the first end face a second end face;
   b) in a container providing a sol solution at least in an amount corresponding to pore volume of the gas permeable partition walls, the sol solution containing a water soluble or colloidal precursor of one or more catalytically active compounds and a water soluble or colloidal precursor of one or more metal oxides catalyst carrier compounds, at least one of the one or more precursors is colloid and at least one of the one or more precursors is water soluble;
   c) placing the monolith substrate substantially vertically in the container with the first or second end face dipped into the sol solution;
   d) sucking up the sol solely by capillary forces into pores of the permeable partition walls from the end face dipped into the sol solution without applying vacuum or pressure to a predetermined distance in the permeable partition walls from the end face dipped into the sol solution;
   e) subsequently inverting the monolith substrate and placing the monolith substrate substantially vertically in the container with the opposite end face dipped into the sol solution;
   f) sucking up the sol solely by capillary forces into pores of the permeable partition walls from the opposite end face dipped into the sol solution without applying vacuum or pressure; and
   g) drying and calcining the thus coated monolith substrate.

2. The method of claim 1, wherein the predetermined distance is about half of the whole distance between the end faces.

3. The method of claim 1, wherein the predetermined distance corresponds to about half of the amount of the sol solution in the container.

4. The method of claim 1, wherein the sucking up of the sol solution is performed at a temperature of between 15 and 30° C.

5. The method of claim 1, wherein the monolith substrate is a wall flow filter.

6. The method of claim 1, wherein the water soluble or colloidal precursors of one or more catalytically active compounds are selected from the group consisting of compounds of palladium, platinum, rhodium, vanadium, molybdenum, tungsten and mixtures thereof.

7. The method of claim 1, wherein the water soluble or colloidal precursors of one or more metal oxides catalyst carrier compounds are selected from the group consisting of compounds of aluminium, titanium, cerium, zirconium, silicon and mixtures thereof.

8. The method of claim 1, wherein the porous monolith substrate is metallic or ceramic.

9. The method of claim 1, wherein the porous monolith substrate is cordierite, aluminium titanate, mullite or silicon carbide.

10. The method of claim 1, wherein particle size of the colloidal precursors of one or more catalytically active compounds and the colloidal precursors of one or more metal oxides catalyst carrier compounds is between 1 and 1000 nm.

11. The method of claim 10, wherein the particle size of the colloidal precursors is between 1 and 100 nm.

12. The method of claim 1, wherein steps d, e and f are repeated once or more times.

13. The method according to claim 1, wherein the drying in step is performed by application of microwaves.

* * * * *